United States Patent [19]

Aso et al.

[11] Patent Number: 5,187,342
[45] Date of Patent: Feb. 16, 1993

[54] WIRE CUT ELECTRIC DISCHARGE MACHINE

[75] Inventors: Toshiyuki Aso; Toshio Hirai, both of Oshino, Japan

[73] Assignee: Fanuc Ltd, Minamitsuru, Japan

[21] Appl. No.: 635,626

[22] PCT Filed: May 28, 1990

[86] PCT No.: PCT/JP90/00682

§ 371 Date: Jan. 2, 1991

§ 102(e) Date: Jan. 2, 1991

[30] Foreign Application Priority Data

Jun. 29, 1989 [JP] Japan ................................ 1-165323

[51] Int. Cl.⁵ .......................... B23H 7/36; B23H 7/02
[52] U.S. Cl. ................................ 219/69.14; 219/69.12
[58] Field of Search ................ 219/69.12, 69.14, 69.17

[56] References Cited

U.S. PATENT DOCUMENTS 4,833,290  5/1989  Obara ................ 219/69.12

FOREIGN PATENT DOCUMENTS 63-256314 10/1980 Japan ................ 219/69.14
56-10130   3/1981 Japan .
60-94225   5/1985 Japan ................ 219/69.14
61-111829  5/1986 Japan .
1-164521   6/1989 Japan ................ 219/69.14

Primary Examiner—Geoffrey S. Evans
Attorney, Agent, or Firm—Staas & Halsey

[57] ABSTRACT

A wire cut electric discharge machine provided with a machining fluid supply apparatus capable of supplying machining fluid in an amount large enough to permit a stable wire extension even in a finishing operation. During rough machining, a first flow regulating valve (6) provided in a first pipe (3) and a second flow regulating valve (10) and an on-off valve (11) respectively provided in a second pipe (4) are fully opened, so that machining fluid is injected from upper and lower nozzles (5, 9) respectively connected to these pipes. In the finishing operation, openings of the first and second flow regulating valves are reduced. When wire extension is carried out, the on-off valve in the second pipe is fully closed, and an on-off valve (7) provided in a bypass pipe (8) and fully closed during both the rough machining and the finishing operation is fully opened, whereby an amount of machining fluid large enough to reliably guide a wire electrode is injected from a jet nozzle connected to the bypass pipe and attached to the upper nozzle, regardless of the opening of the first flow regulating valve which varies between the rough machining and the finishing operation.

5 Claims, 1 Drawing Sheet

WIRE CUT ELECTRIC DISCHARGE MACHINE

TECHNICAL FIELD

The present invention relates to a wire cut electric discharge machine, and more particularly, to a machining fluid supply apparatus capable of supplying machining fluid in an amount enough to ensure stable wire extension even in a finishing operation.

BACKGROUND ART

Generally, a wire cut electric discharge machine comprises upper and lower nozzles respectively provided at upper and lower wire guides, and machining fluid supply pipe lines connected to these nozzles, and is arranged to inject machining liquid from the upper and lower nozzles toward an electric discharge machining region between a workpiece and a wire electrode, to thereby remove the sludge and heat produced during electric discharge machining. For rough machining, the opening degrees of flow regulating valves respectively provided in the machining fluid supply pipe lines are increased, to thereby supply the machining fluid in an amount large enough to remove the sludge and heat that are produced in large quantities during the rough machining. On the other hand, in a finishing operation including a second cut, the valve openings are decreased, so as to reduce a deviation of the wire electrode due to the injection pressure of the machining fluid, to thereby improve machining accuracy.

In the aforementioned type of electric discharge machine, it is known to carry out automatic wire extension by using the machining fluid. Namely, at the time of wire extension, the machining fluid is jetted toward the workpiece from a jet nozzle mounted to the upper nozzle, while the injection of the machining fluid from the lower nozzle is interrupted. Then, the wire electrode is fed from the upper wire guide, while being restricted by the jet of the machining fluid, so that the wire passes through a machining initial hole formed in the workpiece and the wire passage of the lower wire guide, thereby effecting the wire extension.

During a finishing operation, however, since the openings of the flow regulating valves in the machining fluid supply pipe lines are small, the amount of the machining fluid supplied to the jet nozzle is reduced, and hence the injection pressure of the jet stream of machining fluid is lowered. The thus reduced injection pressure sometimes causes an unsuccessful wire extension performed in the middle of a finishing operation.

DISCLOSURE OF THE INVENTION

An object of the present invention is to provide a wire cut electric discharge machine equipped with a machining fluid supply apparatus capable of supplying machining fluid in an amount large enough to ensure stable wire extension even in a finishing operation.

To achieve the above-mentioned object, a wire cut electric discharge machine of the present invention comprises a main pipe line connecting a machining fluid supply source to an upper nozzle, a bypass pipe line connecting the machining fluid supply source to the upper nozzle, a flow regulating valve provided in the bypass pipe line, and control means for varying an opening of the flow regulating valve in dependence on whether or not the electric discharge machine is operated in a wire extension mode.

As described above, according to the present invention, the opening of the flow regulating valve disposed in the bypass pipe line, which is provided separately from the main pipe line, is varied in dependence on whether or not the electric discharge machine is operated in the wire extension mode. Accordingly, it is possible to supply an amount of machining fluid large enough to permit stable wire extension even in a finishing operation, whereby the wire extension can be reliably performed.

BRIEF DESCRIPTION OF THE DRAWING

The single FIGURE is a schematic diagram showing a principal part of a wire cut electric discharge machine according to an embodiment of the present invention.

BEST MODE OF CARRYING OUT THE INVENTION

Figure 1:
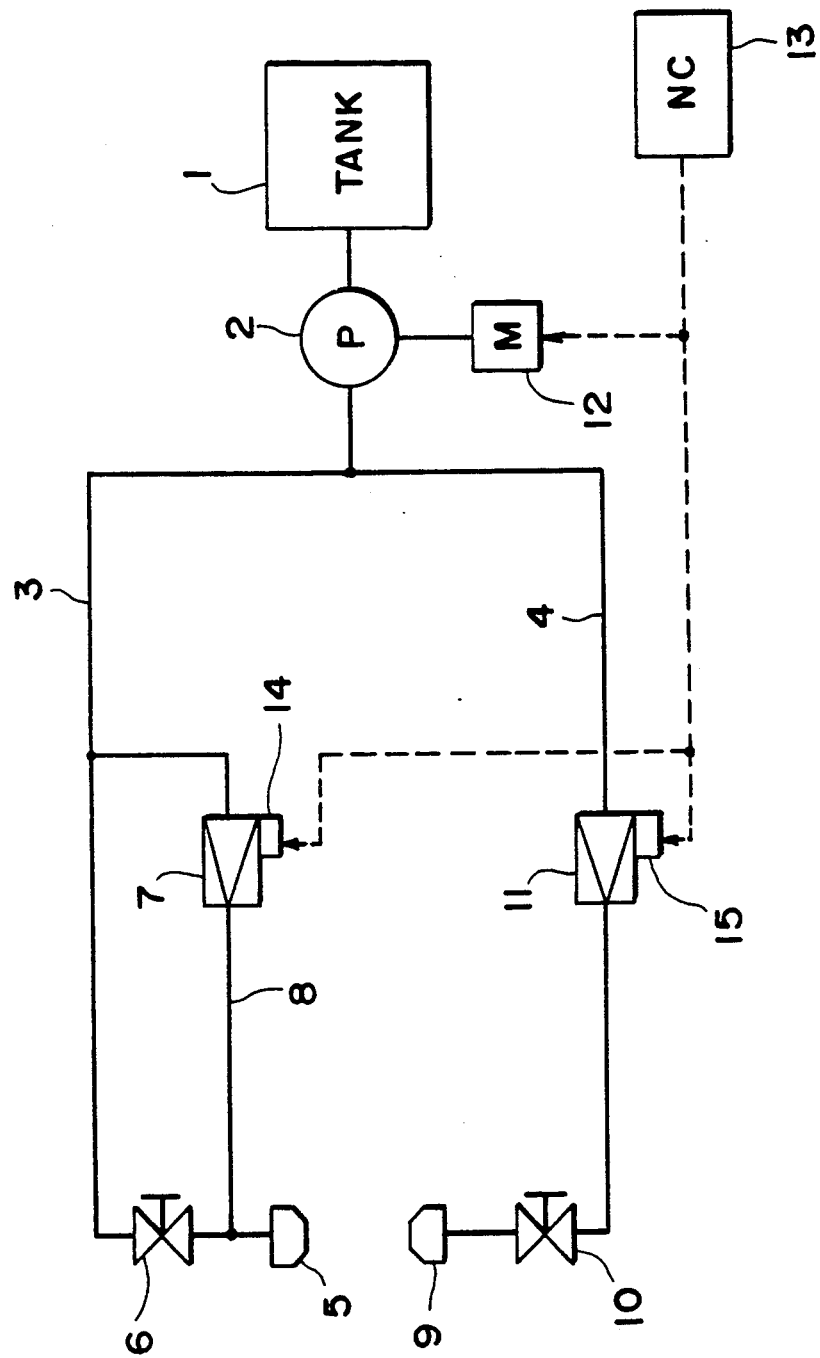

Referring to the appended drawing, a wire cut electric discharge machine of an embodiment of the present invention comprises a tank 1 for storing machining fluid, a pump 2 for pressurizing the machining fluid supplied from the tank 1, and a motor 12 for driving the pump 2. First and second pipe lines 3 and 4 are connected at their one ends to the discharge port of the pump 2. Other ends of these pipe lines 3, 4 are respectively connected to upper and lower nozzles 5 and 9. First and second automatic flow regulating valves 6 and 10 are disposed in the middle of the first and second pipe lines 3, 4, respectively. Preferably, these valves 6, 10 are each provided with a flow meter, not shown. One end of a bypass pipe line 8 is connected to that portion of the first pipe line (main pipe line) 3 which is located upstream of the first flow regulating valve 6, and the other end of the bypass pipe line 8 is connected to a portion of the first pipe line 3 downstream of the valve 6. Further, a third flow regulating valve 7, which preferably consists of an electromagnetic valve, is disposed in the middled of the bypass pipe line 8, and a fourth flow regulating valve 11, which also preferably comprises an electromagnetic valve, is arranged in a portion of the second pipe line 4 upstream of the valve 10. Electromagnetic valve actuators 14 and 15, respectively associated with the valves 7 and 11, and the motor 12 are connected to a numerical control unit 13 containing a computer for controlling the operation of the electric discharge machine.

The operation of the electric discharge machine will now be described.

During rough machining, the first and second automatic flow regulating valves 6, 10 are fully opened under the control of the numerical control unit 13, and the electromagnetic valve 7 is fully closed while the electromagnetic valve 11 is fully opened, respectively by the electromagnetic valve actuators 14, 15 which respond to control outputs from the numerical control unit 13. Further, the motor 12 is driven under the control of the numerical control unit 13. As a result, the machining fluid from the tank 1 is pressurized by the pump 2 driven by the motor 12, and is supplied to the upper and lower nozzles 5, 9 via the first and second pipe lines 3, 4. Since the valves 6, 10 and 11 are fully opened, a sufficient amount of machining fluid is supplied uniformly from the upper and lower nozzles 5, 9 toward an electric discharge machining region (not shown). Thus, the sludge and heat, which are produced in a relatively large quantity during the rough machining in which machining is effected with relatively large discharging energy at a high speed, can be smoothly removed, whereby the electric discharging at the electric discharge machining region can be stably continued. During the rough machining, the electromagnetic valve 7 is fully closed as mentioned above, and therefore, the supply of machining fluid via the bypass pipe line 8 is interrupted.

During a second cut and subsequent finishing process, the motor 12 is continuously driven under the control of the numerical control unit 13, and the electromagnetic valves 7, 11 are maintained in the fully closed state and fully open state, respectively. Accordingly, the supply of the machining fluid from the pump 2 to the first and second pipe lines 3 and 4 is continued, while the supply of the machining fluid via the bypass pipe line 8 is still stopped. On the other hand, the openings of the first and second flow regulating valves 6, 10 are reduced to preset openings under the control of the numerical control unit 13. Accordingly, the amount of machining fluid injected from the upper and lower nozzles 5, 9 toward the electric discharge machining region is decreased, and thus the injection pressure of the machining fluid is reduced to such a value that a wire electrode (not shown) is not deviated even in the finishing operation where the machining is effected with low discharging energy at a low speed by the use of a relatively thin wire electrode. Meanwhile, the aforesaid preset openings of the valves 6, 10 are set such that the machining fluid is supplied in an amount large enough to remove the sludge and heat produced during the finishing operation.

Upon reading a wire extension command from a program, the numerical control unit 13 drives a conventional driving mechanism (not shown), to attach a jet nozzle (not shown) to the upper nozzle 5, and then drives the electromagnetic valve actuators 14, 15 to thereby fully open the electromagnetic valve 7 and fully close the electromagnetic valve 11, respectively. Then, the numerical control unit 13 drives the pump 2 via the motor 12, and starts feeding the wire electrode through the upper wire guide (not shown). Since the electromagnetic valve 7 is fully opened, the machining fluid from the pump 2 is jetted toward the workpiece from the jet nozzle via the bypass pipe line 8 and the upper nozzle 5. On the other hand, the electromagnetic valve 11 is fully closed, and hence, the supply of machining fluid via the lower nozzle 9 is interrupted.

The wire electrode is fed toward the workpiece while being restricted by the jet of machining fluid. Since the electromagnetic valve 7 is fully opened as described above, a sufficient amount of machining fluid is supplied through the bypass pipe line 8, without influence by the opening of the flow regulating valve 6. Therefore, even when the wire extension is started in the middle of a finishing operation in which the opening of the flow regulating valve 6 is kept small, a sufficiently high pressure of the machining fluid jet is insured. Accordingly, the wire electrode can be reliably guided by a required jet pressure, and smoothly inserted into the machining initial hole of the workpiece and then into a wire passage (not shown) of the lower wire guide.

Thereafter, after the wire electrode is introduced to a wire conveying device (not shown) provided on the downstream side of the lower wire guide so that the wire extension is completed, a detection signal indicating the completion of wire extension is supplied to the numerical control unit 13 again brings the electromagnetic valve 7 into a fully closed state and the electromagnetic valve 11 into a fully open state. The jet nozzle is then detached from the upper nozzle 5, and is reset into a retracted position.

The present invention is not limited to the above embodiment, and various modification thereof may be made. For example, in the embodiment, an automatic flow regulating valve is used for the first and second valve may be used. Moreover, during the wire extension, the first flow regulating valve 6 may be fully closed.

We claim:

1. A wire cut electric discharge machine comprising:
    a main pipe line connecting a machining fluid supply source and an upper nozzle;
    a bypass pipe line connecting the machining fluid supply source and the upper nozzle;
    a flow regulating valve provided in said bypass pipe line; and
    control means for varying an opening of said flow regulating valve in dependence on whether or not the electric discharge machine is operated in a wire extension mode,
    the opening controlled to be larger in the wire extension mode than in a mode which is not the wire extension mode, so that a sufficient amount of machining fluid is supplied to permit wire extension during a finishing operation.

2. A wire cut electric discharge machine according to claim 1, wherein said flow regulating valve comprises an on-off valve, and said control means fully opens said on-off valve when the electric discharge machine is operated in the wire extension mode, and fully closes said on-off valve when the electric discharge machine is not operated in the wire extension mode.

3. A wire cut electric discharge machine according to claim 2, wherein said control means fully opens said on-off valve when supply of machining fluid for wire extension is started, and fully closes the on-off valve when said supply of machining fluid is ended.

4. A wire cut electric discharge machine according to claim 1, further including:
    a flow regulating valve provided in said main pipe line;
    wherein said electric discharge machine is arranged to vary an amount of machining fluid supplied through said main pipe line between when said machine is operated in a rough machining mode and when said machine is operated in a finishing mode;
    and wherein said control means varies the opening of said flow regulating valve provided in said bypass pipe line such that a required amount of machining fluid is supplied through said bypass pipe line, regardless of an opening of said flow regulating valve provided in said main pipe line.

5. A wire cut electric discharge machine according to claim 4, further including:
    a second main pipe line connecting said machining fluid supply source and a lower nozzle; and
    a flow regulating valve and an on-off valve respectively provided in said second main pipe line;
    wherein said electric discharge machine is arranged to vary an amount of machining fluid supplied through said second main pipe line between when said machine is operated in the rough machining mode and when the said machine is operated in the finishing mode;
    and wherein said control means fully closes said on-off valve provided in said second main pipe line when said electric discharge machine is operated in the wire extension mode.

* * * * *

UNITED STATES PATENT AND TRADEMARK OFFICE
CERTIFICATE OF CORRECTION

PATENT NO. : 5,187,342
DATED : February 16, 1993
INVENTOR(S) : Aso et al.

It is certified that error appears in the above-identified patent and that said Letters Patent is hereby corrected as shown below:

Column 2, line 39, change "middled" to

--middle--.

Column 3, line 66, after "13" insert

--in a conventional manner. In response to this detection signal, the numerical control unit 13--.

Column 4, line 6, after "second" insert

--flow regulating valves, but a manual flow regulating--.

Signed and Sealed this

Twenty-third Day of November, 1993

Attest:

BRUCE LEHMAN

*Attesting Officer*   *Commissioner of Patents and Trademarks*